(12) United States Patent
Lum

(10) Patent No.: US 12,014,731 B2
(45) Date of Patent: Jun. 18, 2024

(54) SUGGESTING USER ACTIONS DURING A VIDEO CONFERENCE

(71) Applicant: Zoom Video Communications, Inc., San Jose, CA (US)

(72) Inventor: Samuel Lum, Sunnyvale, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/162,082

(22) Filed: Jan. 29, 2021

(65) Prior Publication Data

US 2022/0246145 A1 Aug. 4, 2022

(51) Int. Cl.
*G10L 15/22* (2006.01)
*H04L 12/18* (2006.01)

(52) U.S. Cl.
CPC .......... *G10L 15/22* (2013.01); *H04L 12/1818* (2013.01); *G10L 2015/223* (2013.01)

(58) Field of Classification Search
None
See application file for complete search history.

(56) References Cited

U.S. PATENT DOCUMENTS

| 10,348,658 | B2 | 7/2019 | Rodriguez et al. |
| 10,530,723 | B2 | 1/2020 | Milligan et al. |
| 11,159,767 | B1 | 10/2021 | Kamisetty et al. |
| 11,368,423 | B1 | 6/2022 | Plater-Zyberk et al. |
| 11,403,123 | B2 | 8/2022 | Krishna et al. |
| 11,502,975 | B2 | 11/2022 | Gershony et al. |
| 11,734,581 | B1 | 8/2023 | Badr et al. |
| 2008/0201434 | A1 | 8/2008 | Holmes et al. |
| 2014/0164305 | A1* | 6/2014 | Lynch ................ G06Q 30/0201 706/46 |
| 2014/0244243 | A1 | 8/2014 | Kim et al. |

(Continued)

OTHER PUBLICATIONS

Tech Research Online, "Best AI Assistant of 2021" Shreeya Chourasia, dated Aug. 5, 2020 (accessed Mar. 19, 2021), 10 pages.

(Continued)

*Primary Examiner* — Stella L. Woo
(74) *Attorney, Agent, or Firm* — Kilpatrick Townsend & Stockton LLP

(57) ABSTRACT

One example method includes receiving, by a computing device, audio during a video conference having a plurality of participants, the audio comprising spoken words by a user of the computing device; recognizing one or more words from the spoken words; identifying one or more keywords within the one or more recognized words; accessing a set of rules comprising one or more rules, each rule of the one or more rules associated with an application of a set of applications, and at least one rule of the one or more rules associated with a functionality of a respective application; determining a context associated with the one or more keywords; determining an application to execute based on the one or more keywords, the context, and the one or more rules, wherein determining the application comprises determining a functionality of the application to invoke; and in response to receiving user confirmation of the functionality of the application to invoke, executing the application and invoking the functionality.

20 Claims, 8 Drawing Sheets

(56) References Cited

U.S. PATENT DOCUMENTS

| | | |
|---|---|---|
| 2016/0055246 A1 | 2/2016 | Marcin et al. |
| 2016/0077794 A1* | 3/2016 | Kim .................. G10L 15/20 704/275 |
| 2016/0301639 A1 | 10/2016 | Liu et al. |
| 2017/0026318 A1 | 1/2017 | Daniel et al. |
| 2017/0330195 A1 | 11/2017 | Lange et al. |
| 2017/0339085 A1 | 11/2017 | Judd et al. |
| 2017/0374176 A1* | 12/2017 | Agrawal ............ G06Q 30/0269 |
| 2018/0367483 A1 | 12/2018 | Rodriguez et al. |
| 2018/0367484 A1 | 12/2018 | Rodriguez et al. |
| 2019/0057698 A1* | 2/2019 | Raanani .............. H04M 3/2281 |
| 2019/0189117 A1* | 6/2019 | Kumar ................ G06F 16/3329 |
| 2020/0092243 A1 | 3/2020 | Milligan et al. |
| 2020/0321005 A1* | 10/2020 | Iyer ...................... G10L 15/193 |
| 2021/0112022 A1 | 4/2021 | Nguyen et al. |
| 2021/0157618 A1 | 5/2021 | Moon |
| 2021/0334473 A1* | 10/2021 | Trehan ................... H04L 51/04 |
| 2021/0357496 A1* | 11/2021 | Lewis ................ G06Q 30/0201 |
| 2021/0389868 A1* | 12/2021 | Crowder ................ A63F 13/63 |
| 2022/0122583 A1* | 4/2022 | Bates ................. H04L 12/1818 |
| 2022/0139383 A1* | 5/2022 | Rose .................. H04L 12/1827 704/232 |
| 2022/0246145 A1 | 8/2022 | Lum |

OTHER PUBLICATIONS

U.S. Appl. No. 18/139,059, "Non-Final Office Action", dated Sep. 13, 2023, 14 pages.

U.S. Appl. No. 18/139,059, "Final Office Action", Feb. 7, 2024, 13 pages.

* cited by examiner

US 12,014,731 B2

SUGGESTING USER ACTIONS DURING A VIDEO CONFERENCE

FIELD

The present application generally relates to video conferences and more particular relates to systems and methods for suggesting user actions during a video conference.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for suggesting user actions during a video conference. One example method includes receiving, by a computing device, audio during a video conference having a plurality of participants, the audio comprising spoken words by a user of the computing device; recognizing one or more words from the spoken words; identifying one or more keywords within the one or more recognized words; accessing a set of rules comprising one or more rules, each rule of the one or more rules associated with an application of a set of applications, and at least one rule of the one or more rules associated with a functionality of a respective application; determining a context associated with the one or more keywords; determining an application to execute based on the one or more keywords, the context, and the one or more rules, wherein determining the application comprises determining a functionality of the application to invoke; and in response to receiving user confirmation of the functionality of the application to invoke, executing the application and invoking the functionality.

One example system includes a non-transitory computer-readable medium; a communications interface; and a processor communicatively coupled to the non-transitory computer-readable medium and the communications interface, the processor configured to execute processor-executable instructions stored in the non-transitory computer-readable medium to cause the processor to: execute video conference software to participate in a video conference having a plurality of participants; receive audio during the video conference, the audio comprising spoken words by a user of the computing device; recognize one or more words from the spoken words; identify one or more keywords within the one or more recognized words; access a set of rules comprising one or more rules, each rule of the one or more rules associated with an application of a set of applications, and at least one rule of the one or more rules associated with a functionality of a respective application; determine a context associated with the one or more keywords; determine an application to execute based on the one or more keywords, the context, and the one or more rules, wherein determining the application comprises determining a functionality of the application to invoke; and in response to receipt of a user confirmation of the functionality of the application to invoke, execute the application and invoke the functionality.

One example non-transitory computer-readable medium includes processor-executable instructions configured to cause a processor to execute video conference software to participate in a video conference having a plurality of participants; receive audio during the video conference, the audio comprising spoken words by a user of the computing device; recognize one or more words from the spoken words; identify one or more keywords within the one or more recognized words; access a set of rules comprising one or more rules, each rule of the one or more rules associated with an application of a set of applications, and at least one rule of the one or more rules associated with a functionality of a respective application; determine a context associated with the one or more keywords; determine an application to execute based on the one or more keywords, the context, and the one or more rules, wherein determining the application comprises determining a functionality of the application to invoke; and in response to receipt of a user confirmation of the functionality of the application to invoke, execute the application and invoke the functionality.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
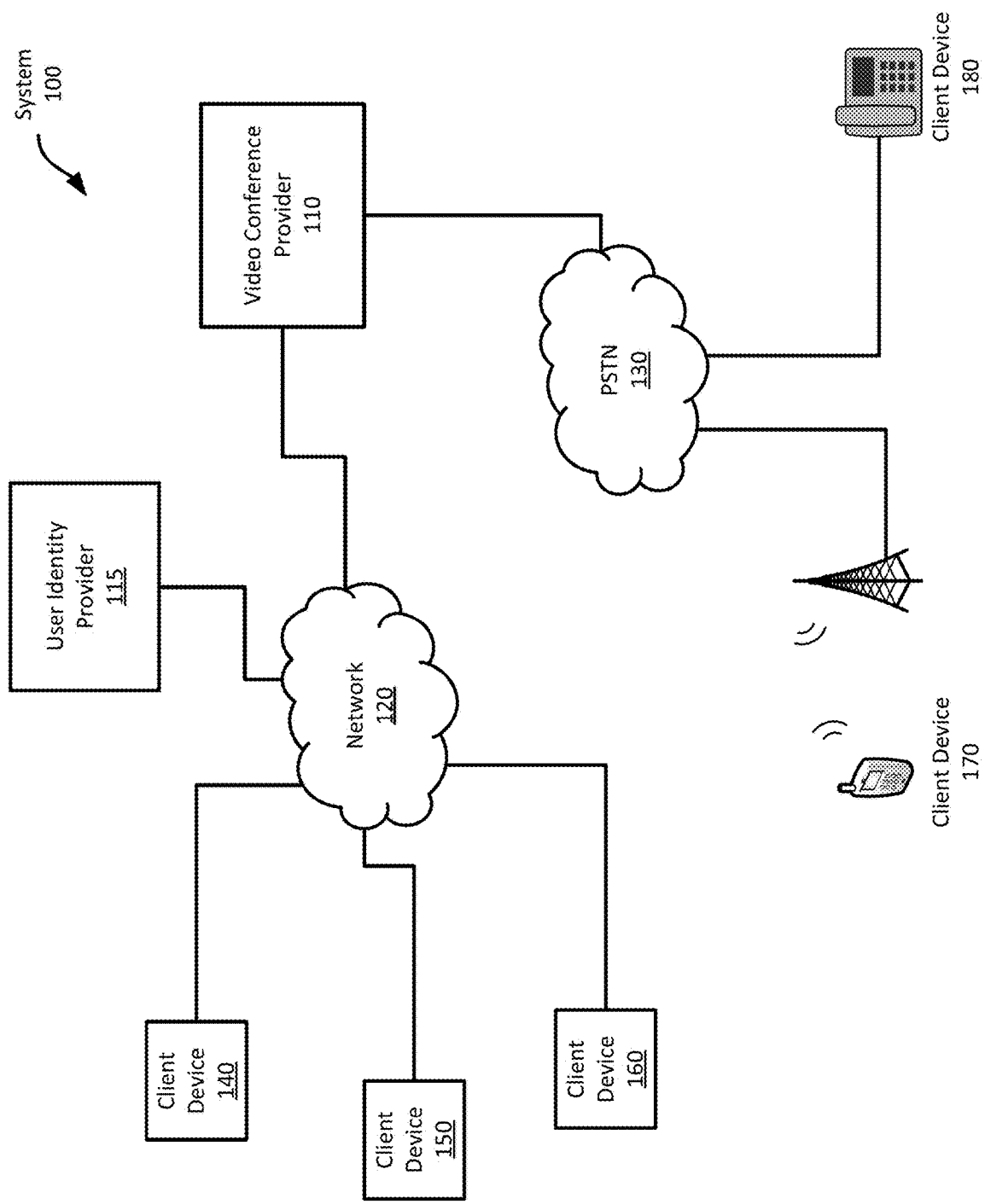
FIGS. 1-3 show example systems for suggesting user actions during a video conference.

Examples are described herein in the context of systems and methods for suggesting user actions during a video conference. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

People participate in video conferences for a wide variety of reasons, such as to keep in touch with family, conduct business, or manage groups or organizations. In some cases, participants in a video conference may need to access certain information, such as customer records, or take action after the video conference is over, such as to send follow-up emails or meeting invitations. Conventionally, people keep track of such actions by taking notes about action items to address after the meeting or by multitasking and manually performing other actions, such as locating and executing one or more applications and performing actions in those applications. Because these actions are taken manually and may rely on the diligence of the individual participants or may distract the participant from the meeting itself, actions items can be forgotten or important information during the video conference may be missed.

To participate in a video conference, each participant uses a software client, which may be a discrete application natively running on the participant's client device or it may be an application executed within a separate environment on the client device, such as in a web browser. The software client accesses the client device's microphone and camera to capture audio and video to enable the user to participate in the video conference. In addition, the software client provides a graphical user interface ("GUI") that includes visual displays of some or all of the participants in the video conference. The software client also outputs audio received from the various participants via speakers or headphones.

An example software client according to this disclosure receives audio and video from its user and provides that data to the video conference provider to distribute to the other participants. In addition, the software client obtains recognized speech from the audio recorded by the client device's microphone, such as by providing the audio to a cloud server to perform speech recognition. The software client then monitors the recognized speech to identify potential keywords that signal actions the user might need to take. For example, the user may mention having a follow-up call or that another meeting should be scheduled. Upon recognizing one or more keywords, the software client may then attempt to determine context surrounding those keywords. Such context may indicate whether an action is indicated or not. For example, if the user says "let's schedule a follow-up in a couple of hours," the software client might identify "schedule" as a keyword and "follow-up in a couple of hours" as context. Such context suggests action is to be taken, such as scheduling a meeting. However, if the user says "my schedule is packed for today," the software client may identify "schedule" as a keyword, but fails to recognize any context suggesting any action to be taken. Various keywords may be used in a variety of contexts, some of which are simply made in passing without indicating particular action, while others may indicate that a user intends to take some action.

After identifying a keyword and determining that the context indicates the user intends to take some action, the client software determines whether the recognized keyword (s) and context corresponds to any rules for actions to take. For example, if a user says "we'll need to have a follow-up call tomorrow to finish up," the client software may determine "call" as a keyword and based on context, e.g., "have a follow-up call tomorrow," determine that the user intends to schedule a future meeting. Similarly, if the user says "I need to check that record in Salesforce," the client software may identify "Salesforce" as a keyword and identify context as being "check that record in Salesforce."

Once the keyword or keywords and context have been recognized, the client software identifies one or more rules that correspond to the keyword and context. For example a rule corresponding to calls or meetings may indicate the user will need to launch a calendar application and invoke functionality to create a new meeting request. Similarly, for an action involving Salesforce, a rule may identify a Salesforce web application and, based on the context, e.g., "check that record," a particular action to invoke, e.g., to retrieve a particular record or access a search page.

If one or more rules is identified, the client software can present a notification to the user indicating one or more possible actions to take and asking for confirmation from the user to proceed. For example, during an internal sales meeting, a user may be discussing several different customers and, in response to a question from a colleague, say that they need to "pull that customer's numbers from our customer database." The client software recognizes the reference to the "customer database" and identifies the context as being to "pull that customer's numbers." It then displays a small pop-up notification asking if the user would like to access the customer database. If the user confirms the notification, the client software then launches the corresponding application access the customer database. In some examples, the client software may also prepopulate a search field with the customer's name or it may directly navigate to the customer's record.

By performing such functionality, the client software can facilitate the user's ability to perform their job and reduce the burden on them after the video conference. For examples, if the client software is able to access customer records to enable the user to update information or retrieve requested information seamlessly during the meeting, it may reduce the number of post-meeting tasks the user must perform. This can reduce the user's workload and improve their productivity, while further ensuring that various action items discussed during the meeting are not forgotten.

In particular, by passively monitoring the user's speech, the user's client software is able to improve their functionality without being potentially distracted by comments made by other participants or inadvertently asking the user if they want to perform a task that should be performed by another participant. In addition, by only analyzing the user's speech, other participants' privacy can be maintained since their speech is not being acted upon. Thus, examples according to this disclosure can provide an unobtrusive intuitive assistant to help the user more efficiently perform their job functions.

This illustrative example is given to introduce the reader to the general subject matter discussed herein and the disclosure is not limited to this example. The following sections describe various additional non-limiting examples and examples of systems and methods for suggesting user actions during a video conference.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
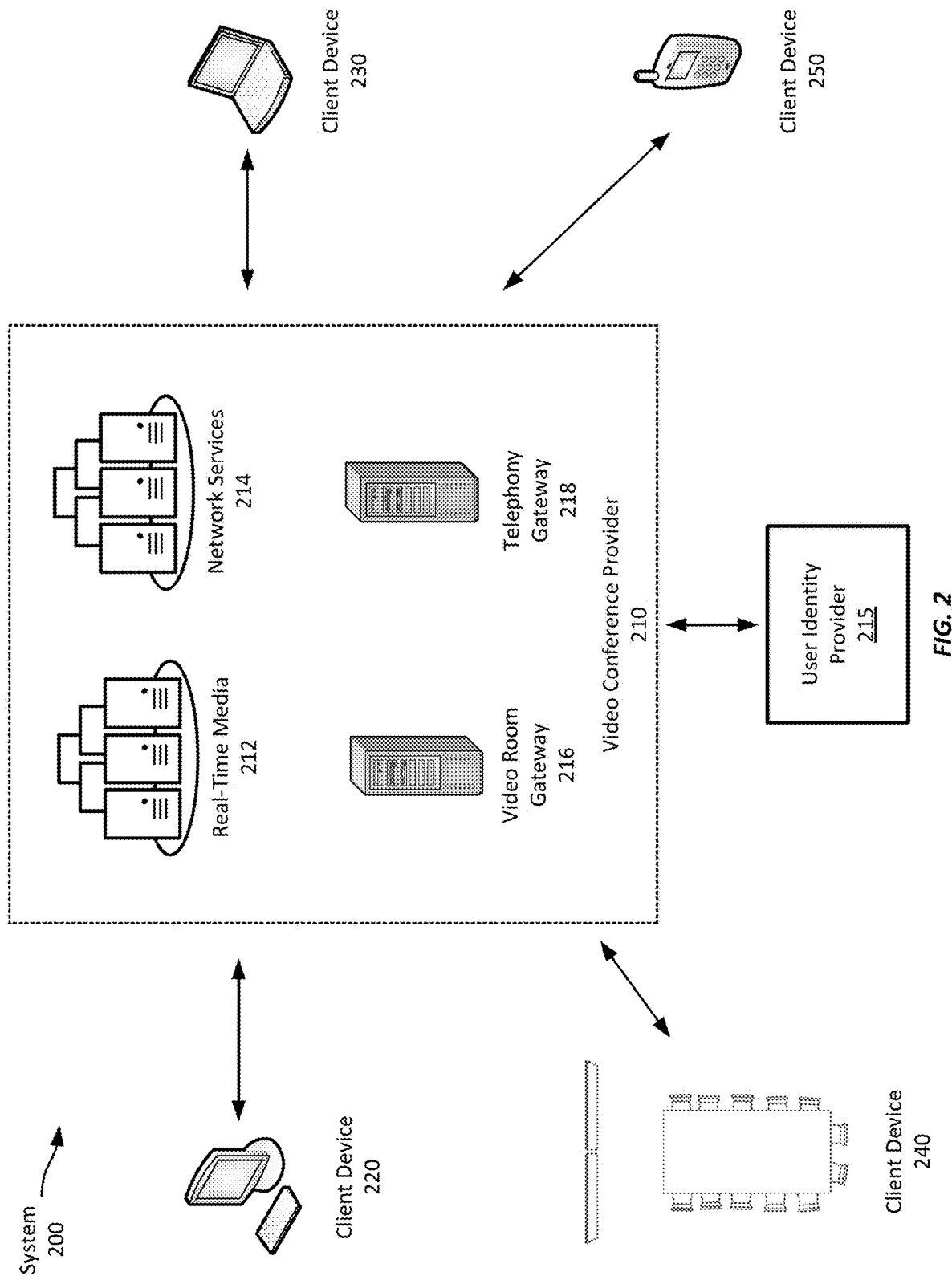

Video conference provider 110 allows clients to create video conference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common video conference may be used. Further, in some examples, and as alluded to above, a meeting may also have "breakout" rooms. Such breakout rooms may also be rooms that are associated with a "main" video conference room. Thus, participants in the main video conference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including keypair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210.

For example, the video conferencing hardware may be provided by the video conference provider to one or more of its subscribers, which may provide access credentials to the video conferencing hardware to use to connect to the video conference provider.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
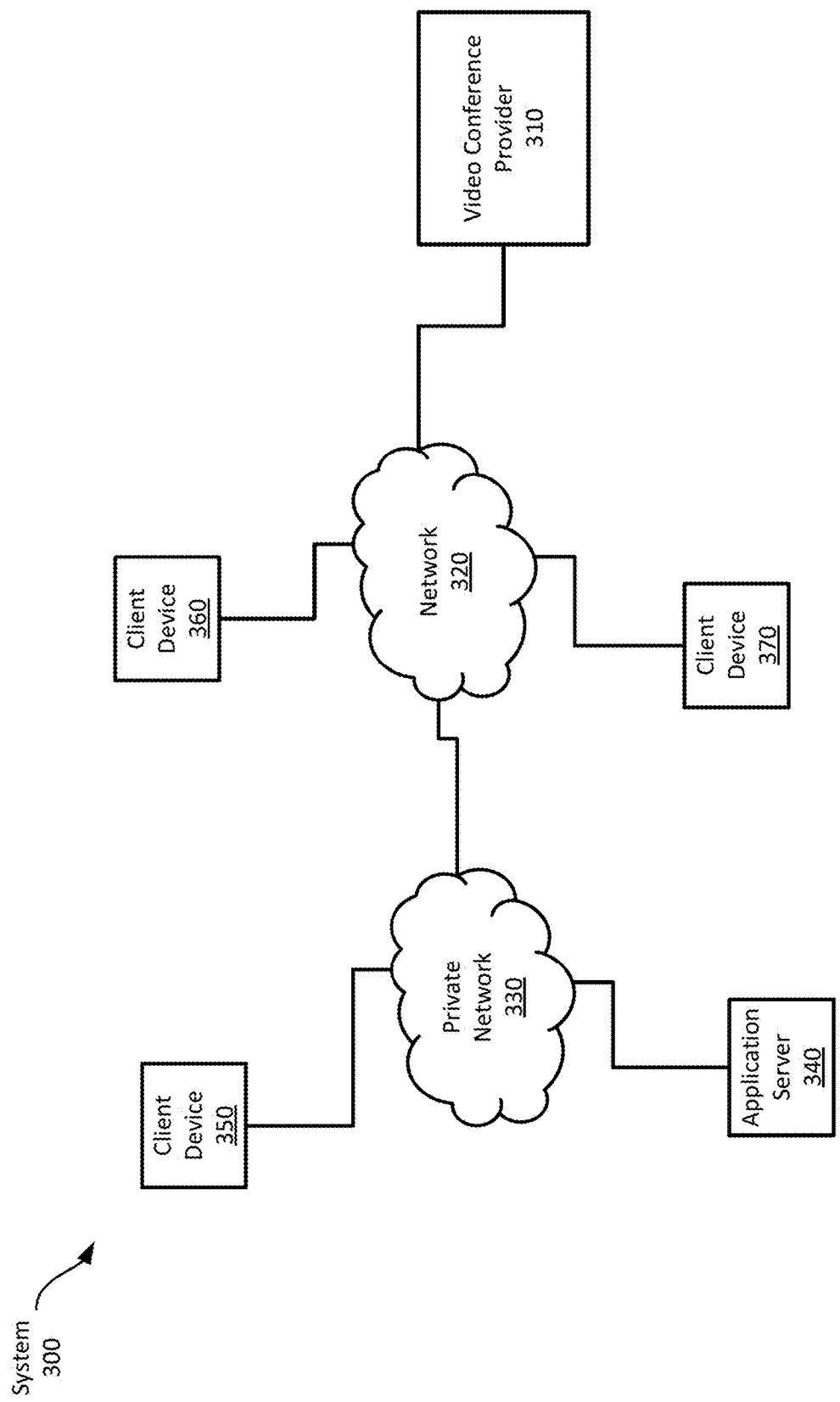

Referring now to FIG. 3, shows an example system 300 for suggesting user actions during a video conference. In this example, a video conference provider 310 provides video conference services to multiple different client devices 350-370, generally as described above with respect to FIGS. 1 and 2. In this example, three client devices 350-370 participate in a meeting hosted by the video conference provider 310. Client devices 360-370 connect to the video conference provider over a public network 320, e.g., the internet; however, client device 350 participates from within a private network 330, such as from their office at work. In addition to the client device 350, an application server 340 is connected to the private network and makes various business applications available to the client device 350. In different examples, these business applications may vary; however, in this example, the application server 350 provides applications to access customer records, sales information, product options, etc. To access these various resources, the client device 350 has different client applications installed on it and may also have web applications accessible via a web browser, which may be stored as bookmarks in the web browser.

During the video conference, the client device 350 records video and audio from its microphone and camera and forwards the audio and video information to the video conference provider 310, which then multiplexes audio and video information from the various client devices 350-370 and distributes multiplexed audio and video generally as discussed above. In addition, in this example, the video conference provider 310 performs speech recognition on incoming audio data from the client device 350.

When the user joins the video conference, they can select an option to enable intuitive assistant functionality. After enabling that functionality, the client device 350 sends an indication to the video conference provider 310 indicating the intuitive assistance feature has been enabled. In response, the video conference provider 310 begins executing speech recognition on incoming audio data from client device 350 and providing recognized speech to the client device 350. Thus, during the video conference, the client device 350 is receiving a substantially real-time transcript of the user's speech.

It should be appreciated that the intuitive assistant functionality may be enabled or disabled at any time during a meeting. Enabling or disabling the functionality will cause the client device 350 to transmit an indication to the video conference provider 310 to activate or deactivate speech recognition for incoming audio from the client device 350. Further, while this example is discussed with respect to client device 350, any of the client device 350-370 may take advantage of such functionality by enabling respective intuitive assistant functionality as discussed herein.

While in this example speech recognition is performed by the video conference provider 310, in some examples, speech recognition may be performed by the respective client device, e.g., client device 350, or may be performed by another computing device, such as a cloud server. To enable such functionality, the client device 350 provides audio data to the speech recognition functionality, such as by providing it to a locally execute speech recognition application or by streaming audio to a remote computing device. After recognizing words from received audio, the speech recognition functionality provides recognized words to the client device 350 substantially in real-time. Depending on where speech recognition is performed, the processing capabilities of the computing device performing speech recognition, and network conditions (if speech recognition is performed remotely from the client device), recognized words may be provided to the client device within a few seconds of the user speaking them.

Figure 4:
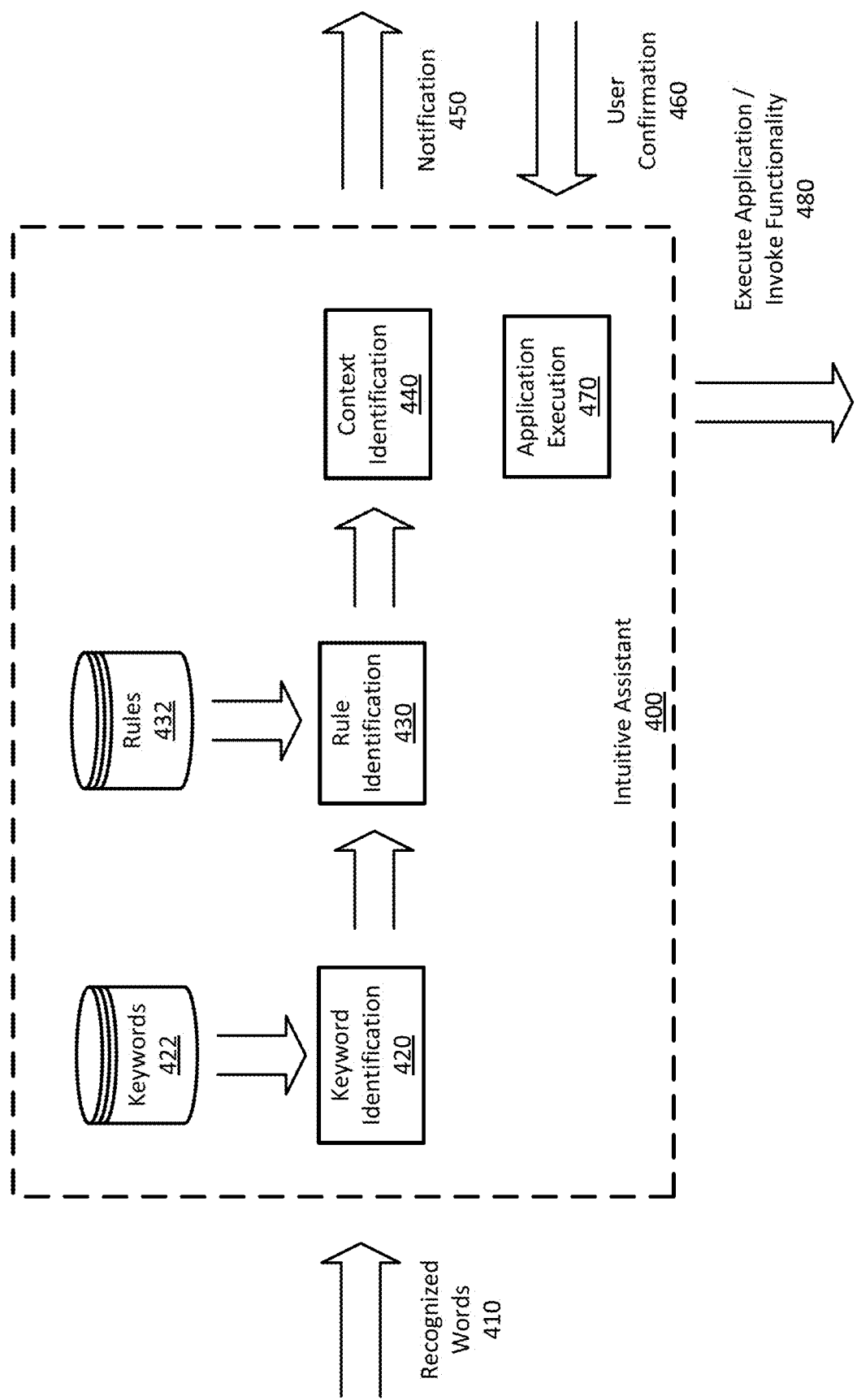
FIG. 4 shows an example intuitive assistant for suggesting user actions during a video conference.

Referring again to FIG. 3, once recognized words are received from the video conference provider, the client device monitors the words for recognized keywords. As discussed above, to perform this functionality, the client device 350 executes an intuitive assistant to identify keywords, identify context corresponding to the keywords, and then identify rules for applications to execute and functionality to invoke. FIG. 4 illustrates an example of an intuitive assistant 400 that may be executed by a client device, such as client device 350.

In FIG. 4, the intuitive assistant 400 receives recognized words 410 based on audio recorded by the client device's microphone. In this example, the recognized words 410 are received from the video conference provider 310, generally as described above; however, as discussed previously, speech recognition may be performed locally at the client device 350 or at any suitable remote computing device, such as a cloud server dedicated to speech recognition.

Once recognized words 410 have been received, the intuitive assistant 400 performs keyword identification 420 using a database of keywords 422 to identify keywords. It should be appreciated that in some examples, recognized words will be streamed to the client device as speech recognition is performed. Thus, receiving recognized words 410 may be a continuous process while the meeting proceeds. The database of known keywords 422 may be queried to identify any keywords in the stream of recognized words 410. It should be understood that a keyword may include more than one word. For example, "customer record" may be a "keyword" as may "follow-up call" or "follow-up meeting." Depending on various implementations, multi-word keywords may be treated as a single keyword or as multiple associated keywords. Further, a keyword may have multiple different forms. For example, a keyword may be a verb, which may be spelled different depending on context, e.g., it is conjugated differently depending on tense, subject, etc. Thus, a keyword may include variants of a base word, e.g., "schedule," "scheduling," and "scheduled." In some examples each of these may be a distinct keyword, while in other examples, the variants may be associated with a base term, e.g., "schedule," that is used as the keyword. However, any suitable approach to recognizing keywords may be used.

If one or more keywords is recognized, the intuitive assistant 400 identifies rules that correspond with the identified keyword. For example, if the recognized keyword is "meeting," rule identification 430 may access a rules database 432 to identify one or more rules associated with meetings, such as accessing a calendar application, generating a new meeting invitation, accessing contact information for participants in the then-current video conference, etc. Similarly, for the keyword customer, rule identification 430 may identify one or more rules associated with customers, such as customer records in a database, sales information (e.g., sales history) associated with a customer, pricing information associated with a customer, etc. Still other kinds of keywords may be associated with rules depending on a particular user. In some examples, a user may obtain rules associated with their respective job function. For example, a patent attorney may create rules to access a patent application in a docketing system or at the US Patent Office and associate such rules with the keyword "patent" or "patent application." Still other rules may be created and stored in a rules database 432 according to an individual user's particular needs. Further, it should be appreciated that multiple different rules databases may be employed, depending on a particular user's role. For example, a salesperson may have a different rules database than a lawyer or CEO in some examples.

Once one or more rules associated with a keyword has been identified, the intuitive assistant then identifies a context 440 associated with the keyword. In this example, to identify a context, the intuitive assistant employs a trained machine learning ("ML") technique to semantically analyze the speech associated with the recognized keyword to determine if the user intends an action or not. To perform the analysis, the trained ML technique may be provided the keyword(s) and a predetermined number of words near the keyword, e.g., preceding and following the keyword(s), such as five to ten words preceding and following the keyword(s). Words such as articles (e.g., "a", "the") or prepositions such as "of" or "for," may be omitted from the word count in some examples. The ML technique may receive the sequence of words and determine whether an action was intended and, if so, what action or actions are intended. For example, if the user says "I'll need to check Salesforce for that information," the ML technique may semantically analyze the words and determine an action on Salesforce was identified and that the action involves accessing a customer record. Alternatively, if the user says "We've been using Salesforce for the past five years," the ML technique may determine that no action involving Salesforce was intended and return a corresponding indication.

While ML techniques may employed in some examples, other examples of context identification 440 functionality may perform word searches for action words or phrases within a predetermined number of words from the identified keyword(s). For example, considering the example above where the user says "I'll need to check Salesforce for that information," the context identification may perform a search for certain words preceding Salesforce, e.g., "access," "look-up," "check," etc. If one of those words is found preceding "Salesforce" by a predetermined number of words, the context identification 440 functionality may determine that an action was intended with respect to Salesforce and the recognized word, e.g., "check," may be used to select an action based on one of the identified rules from the rule identification 430 functionality.

Since people may use jargon or colloquial terms to refer to particular actions, the context identification 440 functionality may normalize recognized words to specific actions. For example, the terms "check," "look-up," "access," "pull up," etc. all refer to the action of accessing information. Thus, the context identification 440 functionality may map such terms to a single action. Such mappings may be provided for multiple different actions and corresponding terms.

Once the context identification 440 has identified that an action is to be taken, it selects one or more of the identified rules based on the identified action. For example, if the action is to "access," any identified rules that correspond to "accessing" may be selected. Similarly if the action is "update," any identified rules that correspond to "updating" may be selected.

In addition to identifying actions, the context identification 440 functionality may identify other context associated with the action. For example, it may identify a customer record to access, e.g., by identifying a name within the recognized words near the keyword or a date and time near the keyword.

It should be appreciated that while rule identification 430 functionality and context identification 440 functionality are described above as operating sequentially, they may instead operate in parallel or context identification 440 functionality may execute before the rule identification 430 functionality. As discussed above, context identification 440 may be performed using a trained ML technique to identify potential actions associated with a keyword, e.g., by extracting a portion of recognized words preceding or following the keyword and providing it to the trained ML technique. Alternatively, context may be determined by recognizing one or more action words associated with the identified keywords, potential objects to act upon, e.g., a customer record, or other information, e.g., dates or times. Such context identification may not rely on any identified rules and thus may execute asynchronously with respect to the rule identification functionality 430. Thus, these two functionalities may operate in any sequence to determine one or more suggested actions.

Further, in some examples, the output of one functionality 430, 440 may be used as input to the other functionality 430, 440. For example, identified context may be used to identify one or more rules. For example, if the identified context identifies a particular action word, a rule may be selected both based on the one or more identified keywords from keyword identification 420 functionality and the action word. Similarly, one or more identified rules may be supplied to the context identification 440 functionality to confine the potential acceptable contexts. For example, if context identification 440 functionality potentially identifies a context that has no corresponding rule, the context identification 440 functionality not discard that potentially identified context. Thus, the rule identification 430 functionality and the context identification 440 functionality may operate together to determine a suggested action.

After determining one or more suggested actions to take, the intuitive assistant outputs a notification 450 to the user indicating actions that may be taken based on the one or more rules, e.g., accessing a Salesforce record or creating a new meeting. The notification may be displayed on the client device's display along with an option to take the action or to ignore the notification. Alternatively, the notification may not include any options, but may respond to being interacted with, e.g., by touching the notification (on a device with a touch screen) or moving a cursor onto the notification and pressing a button. Alternatively, the user may simply ignore the notification, which may then disappear after a predetermined period of time, e.g., five to ten seconds.

Figure 5:
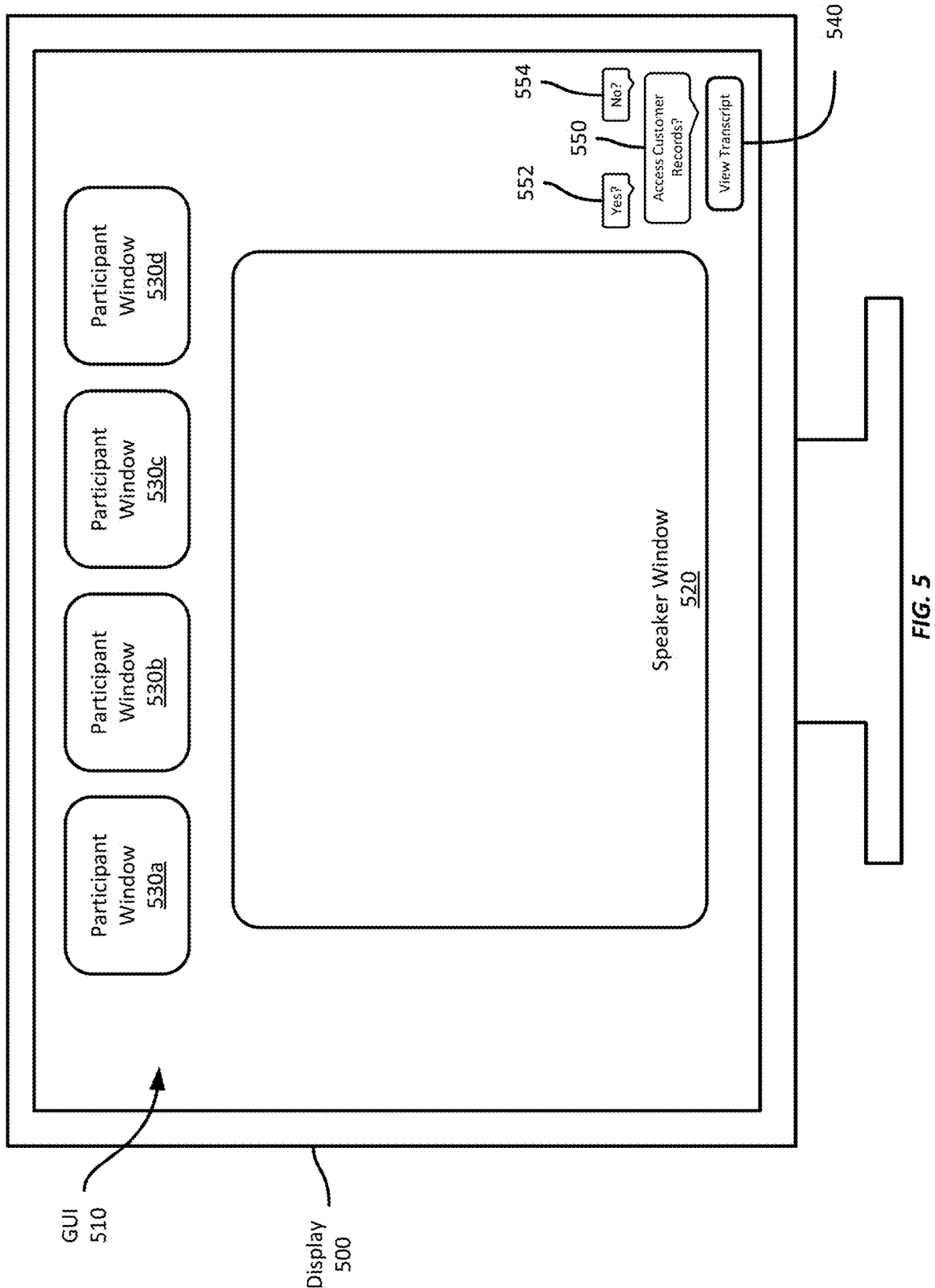
FIG. 5 shows an example graphical user interface for suggesting user actions during a video conference.

For example, FIG. 5 shows an example of a GUI 510 for a software client application that can provide suggestions of user actions during a video conference. The GUI 510 is generated by the software client application and displayed on a display 500 of a computing device, e.g., any of the client devices 350-370 shown in FIG. 3, and the includes multiple different graphical regions to provide information to the user. For example, the GUI 510 includes multiple participant windows 530*a-d* that show representations of participants in a video conference. If the participants are streaming video, the video is displayed in these participant windows 530*a-d*. Alternatively, if a user is not streaming video, a corresponding participant window 530*a-d* may only display the user's name.

In addition to the participant windows 530*a-d*, the GUI 510 also includes a speaker window 520 that shows the participant who is currently speaking so the other participants can see the speaker and better engage with them while they are talking. During a video conference, as different participants speak, the person shown in the speaker window 520 may change multiple times.

In addition to the various user windows 520, 530*a-d*, the GUI also includes an interface element, e.g., a button, that the user to select to view a substantially real-time transcript 540 of the video conference. In this example, the transcript is generated only for audio recorded of the user of the computing device and the GUI 510; however, some examples may provide a transcript of the entire meeting, which may be generated by the video conference provider based on received audio streams from the various participants.

Further, this portion of the GUI 510 also provides notifications 550 of suggested user actions. As discussed above, the user's software client may record audio from the client device's microphone and cause it to be recognized, e.g., by sending it to a remote computing device to perform speech recognition or by performing speech recognition locally. As discussed above, the software client may determine actions that may be suggested to the user. These suggested actions may be presented to the user in an interface element, such as the pop-up balloon 550 shown in FIG. 5, a graphical button (e.g., button 540), an icon, etc. In some examples, the notification interface element 550 may flash to attract the user's attention or it may appear at a different location in the GUI 510.

As discussed above, the user may interact with the notification 550 to indicate whether the software client should execute the recommendation action or not. In this example, the user can select the notification interface element 550, such as by touching it at a corresponding location on a touch screen, selecting it with a mouse cursor, etc. After selecting the notification interface element 550, two options are presented: a "yes" button 552 and a "no" button 554. The user may then select one of these options to either confirm that the suggested action should be taken or to decline to take the suggested action. Alternatively, in this example, the user can ignore the notification 550 and, if no action is taken within a predetermined period of time (e.g., 5-10 seconds), the notification 550 is removed from the GUI and the suggested action is not performed.

Referring again to FIG. 4, after the notification is presented, the user can decide whether to take the suggested action or not. If the user opts to perform the action identified in the notification, the intuitive assistant receives the user confirmation 460 and uses its application execution 470 functionality to identify the application corresponding to the selected notification. For example, it may access the rule corresponding to the selected action to determine a corresponding application to execute. It then issues a command to execute the application 480. In some examples the intuitive assistant may further invoke specific functionality in the application, such as launching a customer search option in a customer database or by launching a calendar application and creating a new blank meeting invitation. Which functionality to invoke may be determined based on the rule corresponding to the suggested action. For example, the rule may specify a calendar application and identify a command to cause a new meeting invitation to be created. If additional information was determined based on the context, e.g., potential recipients of an email or meeting invitation, the application execution 470 functionality may supply such additional information to the application along with invoking the functionality or after the functionality has been invoked, such as to insert email addresses into the recipient list for an email or meeting invitation, or to insert start and end times or dates for an event. In some examples, the suggested action may be modified by the functionality to be invoked. For example, if the suggested action is to access a specific customer record in a web application, a URL for the web application may be modified to specify a specific page in the application or to include a specific query to retrieve the customer record. Thus, in some examples, executing the application and invoking specific functionality may occur essentially simultaneously.

Figure 6:
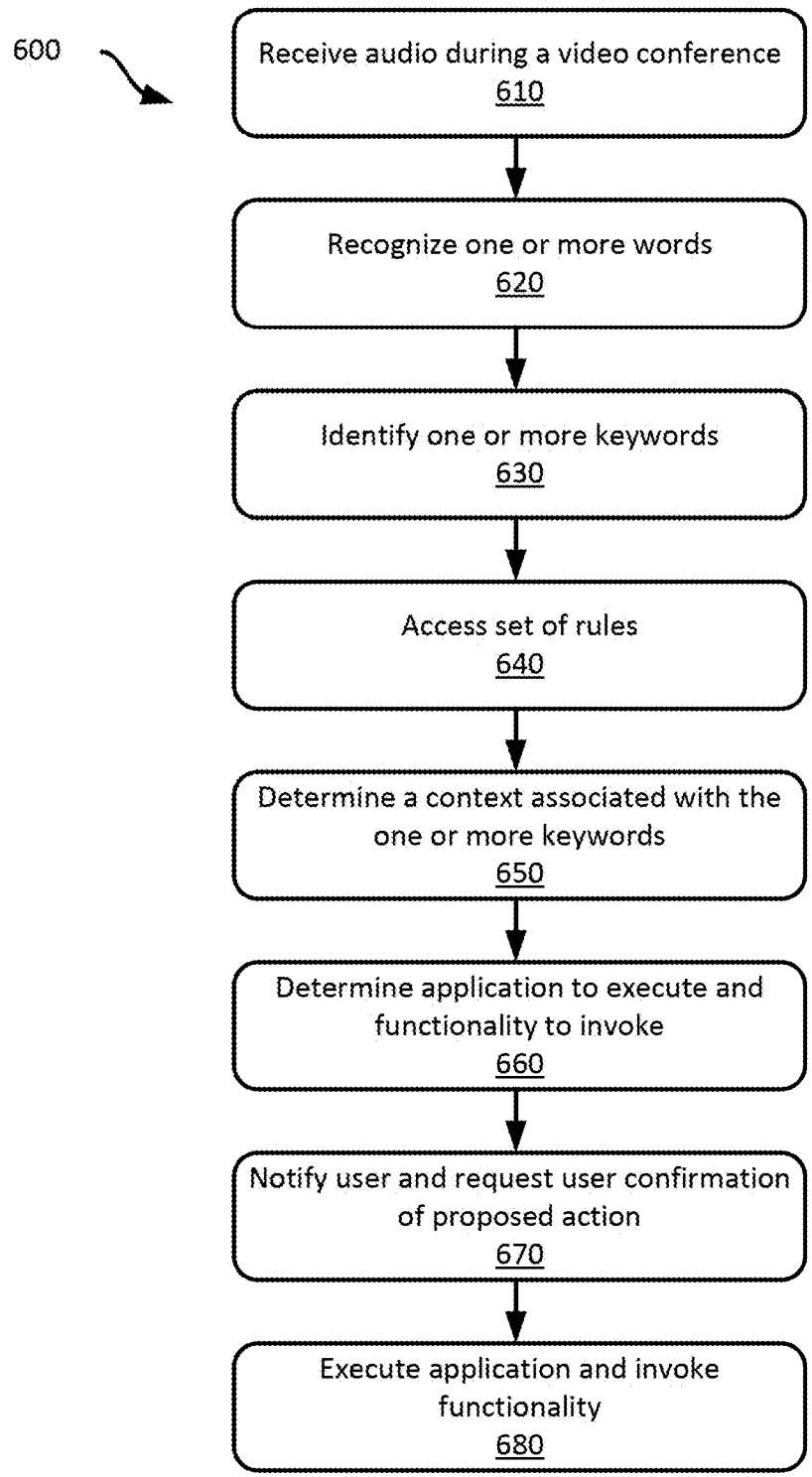
FIGS. 6-7 show example methods for suggesting user actions during a video conference.

Referring now to FIG. 6, FIG. 6 shows an example method 600 for suggesting user actions during a video conference. The example method 600 will be discussed with respect to the system 300 shown in FIG. 3 and the intuitive assistant 400 shown in FIG. 4. However, it should be appreciated that any suitable system or intuitive assistant according to this disclosure may perform this and other example methods.

At block 610, the user's client device 350 receives audio from its microphone during a video conference. Audio capture may be performed by a video conference software client application (or "software client" for this method 600) running natively on the client device 350 or running in an execution environment such as a web browser. In one such an example, the software client application accesses the microphone and obtains streaming audio data. As part of the video conference, the software client may also capture streaming video from an image sensor, such as within a camera. The software client may then stream the audio and video to the video conference provider 310.

At block 620, one or more words from the audio captured by the microphone are recognized. In some examples, speech recognition may be performed locally on the client device 350 or remotely, such as by the video conference provider 310 or by a remote computing device, e.g., a cloud server. The recognized words 410 are provided to the intuitive assistant 400. In this example, recognized words 410 are streamed to the intuitive assistant as they are generated; however, in some examples, recognized words may be provided in batches of a few words based on a predetermined number or words or based on an amount of time elapsed within the audio, e.g., newly recognized words are provided in a batch every five seconds.

At block 630, the intuitive assistant 400 identifies one or more keywords based on the received recognized words. As discussed above, the intuitive assistant 400 may access a database of keywords to identify keywords in the received recognized words generally as described above with respect to FIG. 4, e.g., with respect to the keyword identification 420 functionality.

At block 640, the intuitive assistant 400 determines a context based on the one or more keywords. As discussed above with respect to FIG. 4, the intuitive assistant 400 executes rule identification 430 functionality to identify one or more rules associated with the keyword, generally as described above with respect to FIG. 4.

At block 650, the intuitive assistant 400 determines a context associated with the one or more keywords. In this example, the intuitive assistant 400 employs a trained ML technique to identify a context associated with the one or more keywords; however, the intuitive assistant may determine a context generally as described above with respect to FIG. 4.

At block 660, the intuitive assistant 400 determines an application to execute and functionality of the application to invoke based on the one or more keywords, the identified context, and the one or more identified rules. As discussed above with respect to FIG. 4, the intuitive assistant may determine the application based on the rules in conjunction with the identified context. For example, if the recognized keyword is "email" and the identified context is "send an email to the participants," a corresponding rule for "sending an email" identifies an application to execute, e.g., an email client such as Microsoft Outlook, and functionality to invoke, e.g., create new email and insert recipients into the "to:" field. In some examples, the functionality may be invoked without executing the application. For example, a meeting invitation may be created without launching a calendar application, such as by creating a data file formatted according to a particular application's formatting requirements and with the appropriate information, or by interacting with an application programming interface to initiate functionality in a remotely executed application.

It should be appreciated that in some examples multiple different applications or functionalities may be determined. For example, using the example above, a rule may identify an email client as the application and "create new email without recipients" as the functionality, while a second rule may identify an email client as the application and "create new email and insert recipients into the "to:" field" as the functionality to invoke. A third rule may identify the application as a business contacts application and the identified functionality may be a search function to enable the user to locate contact information corresponding to one or more of the participants. Each of these may be used to provide a suggested action to the user.

At block 670, the intuitive assistant 400 causes a notification to be output to notify the user of the suggested action to execute the application and invoke the identified functionality. Based on determining the application to execute and the functionality to invoke, the intuitive assistant 400 causes a notification identifying the suggested action to be output by the software client, such as the notification 550 shown in GUI 550 of FIG. 5. In some examples, multiple notifications may be output. For example, if multiple different suggestion actions are determined, the intuitive assistant 400 may cause multiple notifications to be simultaneously output by the software client. In some examples, the software client may output multiple notifications simultaneously or provide an option to scroll between different suggested actions.

At block 680, if the user confirms one of the suggested actions, the intuitive assistant 400 causes the client device 350 to execute the application and invoke the suggested functionality. It should be appreciated that executing the application may not require creating a new instance of an application that is already running, but instead, may cause a message to be sent to the application to cause it to perform the functionality to be invoked.

Once the application has been executed and the functionality has been invoked, the method 600 may return to block 610. It should be appreciated that because recognized words may be streamed to the intuitive assistant, one action may suggested to the user as a second suggested action is determined. Thus, portions of the method 600 may be performed asynchronously to each other. For example, keyword identification 420 may continue to execute on received recognized words even if rule identification 430 or context identification 440 functionality is executed based on previously recognized keywords.

Figure 7:
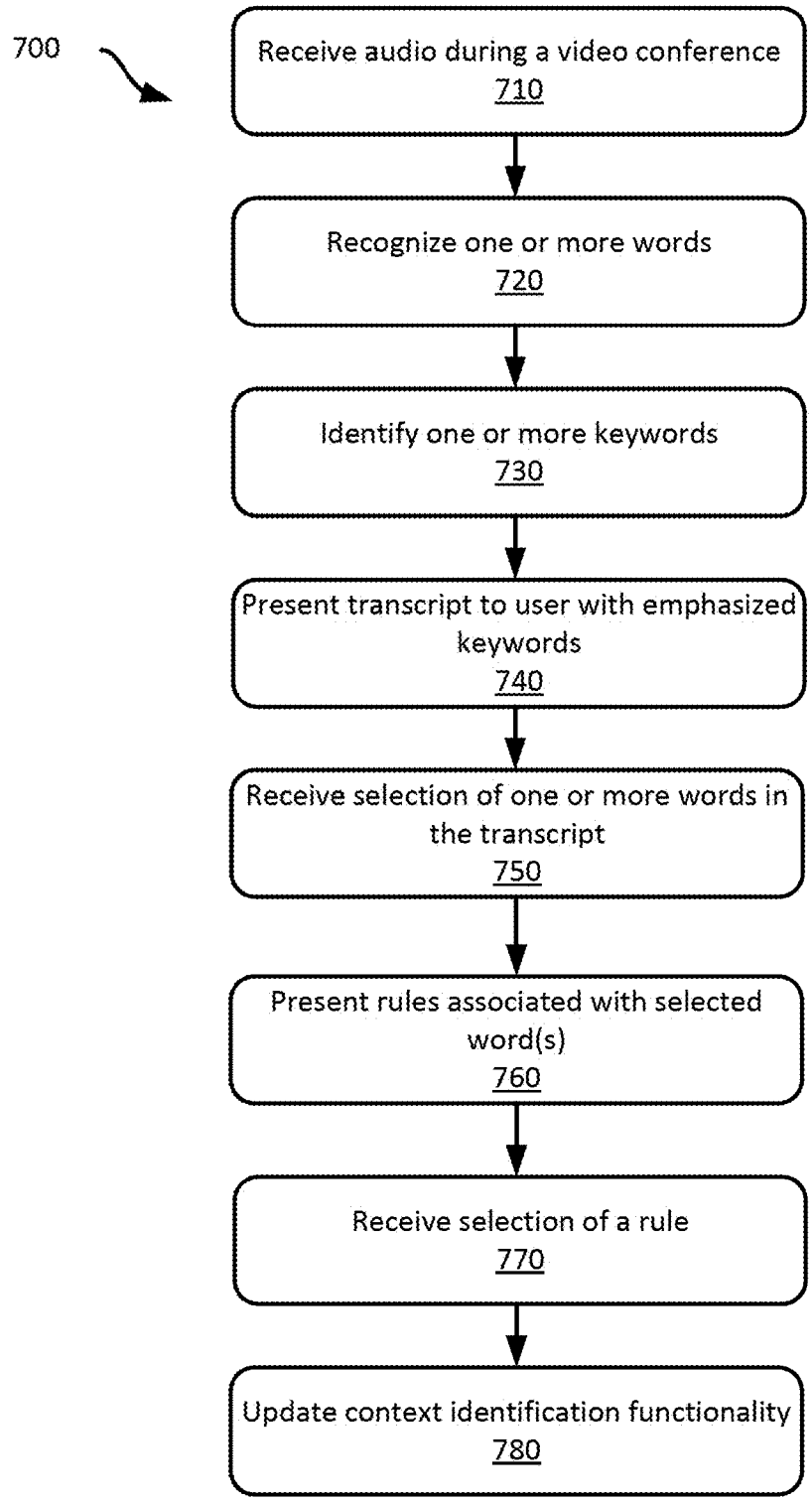

Referring now to FIG. 7, FIG. 7 shows an example method 700 for suggesting user actions during a video conference. The example method 700 will be discussed with respect to the system 300 shown in FIG. 3 and the intuitive assistant 400 shown in FIG. 4. However, it should be appreciated that any suitable system or intuitive assistant according to this disclosure may perform this and other example methods.

The method 700 shown in FIG. 7 can provide a way to train example intuitive assistants, e.g., intuitive assistant 400, according to this disclosure. For example, methods according to method 700 can be used to train the intuitive assistant to learn new keywords or contexts and to apply them to future executions of the method 600 shown in FIG. 6 or other methods according to this disclosure.

At block 710, the user's client device 350 receives audio from its microphone during a video conference generally as discussed above with respect to block 610 of FIG. 6.

At block 720, one or more words from the audio captured by the microphone are recognized generally as discussed above with respect to block 620 of FIG. 6.

At block 730, the intuitive assistant 400 identifies one or more keywords in the received recognized words generally as discussed above with respect to block 630 of FIG. 6.

At block 740, the intuitive assistant 400 causes the user's client device 350 to display a transcript, or a portion of a transcript, of the audio received from the microphone at 710. In some examples, the transcript may be provided in real-time during the meeting; however, in some examples, it may be provided after the meeting has concluded.

In displaying the transcript, the intuitive assistant 400 causes the user's client device 350 to emphasize each recognized keyword in the transcript. For example, keywords may be emphasized with a bold-face font, underlining, a different color or font, background shading, a box or other shape encircling the keyword, etc. It should be appreciated that any suitable way to distinguish the keywords from the remaining text of the transcript may be employed. For example, the keywords may be displayed using a standard font and color (e.g., times new roman, 12-point, black), while the remaining text of the transcript may be displayed in the same font, but in a lighter color, e.g., a light great. Thus, by de-emphasizing the remaining text of the transcript, the keywords are emphasized to the viewer.

At block 750, the user's client device 350 receives a selection of one or more words in the transcript. For example, the user may use a mouse or a touch screen to select words in the transcript. The selected word(s) may include one or more keywords, or it may not include any keywords.

At block 760, the user's client device 350 presents rules associated with the selected word or words from the transcript. For example, the user's client device 350 may present the rules in a scrollable list or in a dropdown menu. In some examples, the user may perform an action to open a context-sensitive menu, such as by right-clicking on the selected word(s) or by performing a gesture to summon a context-sensitive menu.

To identify the rules to present, the intuitive assistant 400 may identify a context associated with the selected words, which may be used to identify one or more rules, generally as described above with respect to FIG. 4. In some examples, rules associated with any selected keywords may be presented.

In one example, the user may select a word or words that do not include a keyword. In such an example, the user's client device 350 may present an empty list or a notification that no rules were identify corresponding to the selected text. It may instead (or also) present an option to create a new keyword based on one or more of the selected words. If the user selects the option to create a new keyword, the intuitive assistant 400 may add the keyword to the keyword database 422. It may also ask the user to generate a rule corresponding to the keyword. The user may then select an application and identify functionality to be invoked. In response, the intuitive assistant 400 may add the rule to the rules database 432 and present the rule for the user to select.

At block 770, the intuitive assistant 400 receives a selection of a rule from the presented rules. For example, the user may click or touch the desired rule. If the user has created a new rule, the user may select the newly added rule or the newly added rule may be automatically selected.

At block 780, the intuitive assistant 400 updates the context determination functionality. In this example, the intuitive assistant 400 updates the context identification 400 functionality based on the selected word or words. For example, if the user selects multiple words, but only identifies one word or a subset of the words as a keyword, the remaining words may be determined to be context associated with the keyword.

In an example where the context determination 400 functionality employs a trained ML technique, the ML technique may be further trained based on the keyword and the identified context. In an example that does not employ an ML technique, the context identification 400 functionality may identify one or more action verbs, objects to be acted open, or other semantic information to determine a semantic meaning associated with the selected words. From such an analysis, the context identification 400 functionality may associate a particular action with the keyword to determine a context in a subsequent user of the keyword.

Once the context identification functionality has been updated, the intuitive assistant 400 may employ the updated keywords, rules, or context identification for subsequently received recognized words, e.g., during execution of example methods according to FIG. 6.

Figure 8:
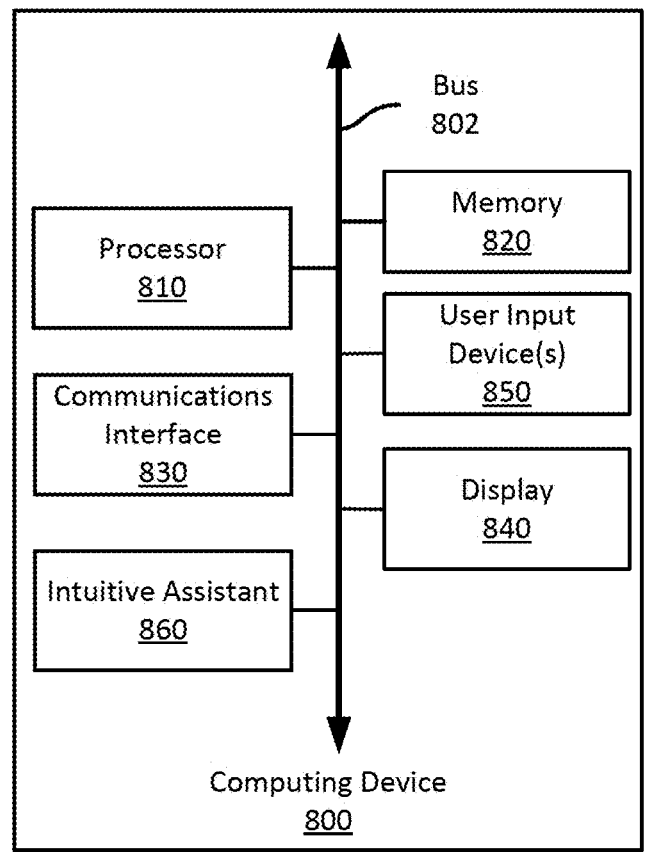
FIG. 8 shows an example computing device suitable for use with various systems and methods according to the present disclosure.

Referring now to FIG. 8, FIG. 8 shows an example computing device 800 suitable for use in example systems or methods for suggesting user actions during a video conference according to this disclosure. The example computing device 800 includes a processor 810 which is in communication with the memory 820 and other components of the computing device 800 using one or more communications buses 802. The processor 810 is configured to execute processor-executable instructions stored in the memory 820 to execute an intuitive assistant 800 according to this disclosure or to perform one or more methods for suggesting user actions during a video conference according to different examples, such as part or all of the example methods 600, 700 described above with respect to FIGS. 6 and 7. The computing device, in this example, also includes one or more user input devices 850, such as a keyboard, mouse, touchscreen, video capture device, microphone, etc., to accept user input. The computing device 800 also includes a display 840 to provide visual output to a user.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
  receiving and passively monitoring, by a video conference software executed by a client computing device, audio received by a microphone of the client computing device during a video conference having a plurality of participants, the audio comprising spoken words by a user of the client computing device;
  recognizing, by the video conference software, one or more words from the spoken words based on the passive monitoring;
  identifying one or more keywords based on the one or more recognized words;
  accessing a set of rules comprising one or more rules, each rule of the one or more rules associated with an application of a set of applications, and at least one rule of the one or more rules associated with a functionality of a respective application;
  determining a context associated with the one or more keywords;
  determining an application to execute based on the one or more keywords, the context, and the one or more rules, wherein determining the application comprises determining a functionality of the application to invoke; and
  in response to receiving user confirmation of the functionality of the application to invoke, executing the application and invoking the functionality.

2. The method of claim 1, further comprising:
  outputting a notification to the user, the notification suggesting executing the application and invoking the functionality; and
  wherein receiving the user confirmation comprises receiving a user interaction with the notification.

3. The method of claim 1, wherein the one or more keywords comprises a name of the application.

4. The method of claim 1, wherein the context comprises a keyword associated with an action.

5. The method of claim 1, wherein the one or more rules comprise associations between applications, contexts, and actions.

6. The method of claim 1, further comprising determining application data from the one or more keywords and supplying the application data to the application or the invoked functionality.

7. The method of claim 1, further comprising:
  recognizing one or more additional words from the spoken words;
  identifying one or more additional keywords from the one or more additional words;
  accessing the one or more rules;
  determining a second context based on the one or more recognized additional words;
  determining a second application to execute based on the one or more additional keywords, the second context, and the one or more rules, wherein determining the second application comprises determining a second functionality of the second application to invoke; and
  in response to receiving a rejection of the second functionality of the second application to invoke, not executing the application.

8. The method of claim 7, further comprising:
  outputting a second notification to the user, the second notification suggesting executing the second application and invoking the second functionality; and wherein receiving the rejection comprises not receiving a user interaction with the second notification after a predetermined period of time.

9. The method of claim 1, further comprising:
presenting a transcript of the spoken words comprising the one or more recognized words;
emphasizing the one or more keywords in the transcript based on the set of rules;
receiving a first selection of (i) at least one of the one or more keywords, (ii) one or more additional words of the transcript, and (iii) at least one rule of the set of rules; and
updating a context identification component based on the selection.

10. A system comprising:
a non-transitory computer-readable medium;
a communications interface;
a microphone; and
a processor communicatively coupled to the non-transitory computer-readable medium and the communications interface, the processor configured to execute processor-executable instructions stored in the non-transitory computer-readable medium to cause the processor to:
execute video conference software to participate in a video conference having a plurality of participants;
receive and passively monitor, by the video conference software, audio received by the microphone during the video conference, the audio comprising spoken words by a user of the video conference software;
recognize, by the video conference software, one or more words from the spoken words based on the passive monitoring;
identify one or more keywords based on the one or more recognized words;
access a set of rules comprising one or more rules, each rule of the one or more rules associated with an application of a set of applications, and at least one rule of the one or more rules associated with a functionality of a respective application;
determine a context associated with the one or more keywords;
determine an application to execute based on the one or more keywords, the context, and the one or more rules, wherein determining the application comprises determining a functionality of the application to invoke; and
in response to receipt of a user confirmation of the functionality of the application to invoke, execute the application and invoke the functionality.

11. The system of claim 10, wherein the processor is configured to execute further processor-executable instructions stored in the non-transitory computer-readable medium to cause the processor to:
output a notification to the user, the notification suggesting executing the application and invoking the functionality; and
receive a user interaction with the notification.

12. The system of claim 10, wherein the processor is configured to execute further processor-executable instructions stored in the non-transitory computer-readable medium to cause the processor to determine application data from the one or more keywords and supplying the application data to the application or the invoked functionality.

13. The system of claim 10, wherein the processor is configured to execute further processor-executable instructions stored in the non-transitory computer-readable medium to cause the processor to:
recognize one or more additional words from the spoken words;
identify one or more additional keywords from the one or more additional words;
access the one or more rules;
determine a second context based on the one or more recognized additional words;
determine a second application to execute based on the one or more additional keywords, the second context, and the one or more rules, wherein determining the second application comprises determining a second functionality of the second application to invoke; and
in response receipt of a rejection of the second functionality of the second application to invoke, not execute the application.

14. The system of claim 13, wherein the processor is configured to execute further processor-executable instructions stored in the non-transitory computer-readable medium to cause the processor to:
output a second notification to the user, the second notification suggesting executing the second application and invoking the second functionality; and
wherein receipt of the rejection comprises not receipt of a user interaction with the second notification after a predetermined period of time.

15. The system of claim 10, wherein the processor is configured to execute further processor-executable instructions stored in the non-transitory computer-readable medium to cause the processor to:
present a transcript of the spoken words comprising the one or more recognized words;
emphasize the one or more keywords in the transcript based on the set of rules;
receive a first selection of (i) at least one of the one or more keywords, (ii) one or more additional words of the transcript, and (iii) at least one rule of the set of rules; and
update a context identification component based on the selection.

16. A non-transitory computer-readable medium comprising processor-executable instructions configured to cause a processor to:
execute video conference software on a client computing device to participate in a video conference having a plurality of participants;
receive and passively monitor, by the video conference software, audio received by a microphone of the client computing device during the video conference, the audio comprising spoken words by a user of the video conference software;
recognize, by the video conference software, one or more words from the spoken words based on the passive monitoring;
identify one or more keywords based on the one or more recognized words;
access a set of rules comprising one or more rules, each rule of the one or more rules associated with an application of a set of applications, and at least one rule of the one or more rules associated with a functionality of a respective application;
determine a context associated with the one or more keywords;

determine an application to execute based on the one or more keywords, the context, and the one or more rules, wherein determining the application comprises determining a functionality of the application to invoke; and in response to receipt of a user confirmation of the functionality of the application to invoke, execute the application and invoke the functionality.

17. The non-transitory computer-readable medium of claim 16, further comprising non-transitory computer-readable medium comprising processor-executable instructions configured to cause a processor to:

output a notification to the user, the notification suggesting executing the application and invoking the functionality; and receive a user interaction with the notification.

18. The non-transitory computer-readable medium of claim 16, further comprising determining application data from the one or more keywords and supplying the application data to the application or the invoked functionality.

19. The non-transitory computer-readable medium of claim 16, wherein the processor is configured to execute further processor-executable instructions stored in the non-transitory computer-readable medium to cause the processor to:

recognize one or more additional words from the spoken words;

identify one or more additional keywords from the one or more additional words;

access the one or more rules;

determine a second context based on the one or more recognized additional words;

determine a second application to execute based on the one or more additional keywords, the second context, and the one or more rules, wherein determining the second application comprises determining a second functionality of the second application to invoke; and in response receipt of a rejection of the second functionality of the second application to invoke, not execute the application.

20. The non-transitory computer-readable medium of claim 16, further comprising non-transitory computer-readable medium comprising processor-executable instructions configured to cause a processor to:

present a transcript of the spoken words comprising the one or more recognized words;

emphasize the one or more keywords in the transcript based on the set of rules;

receive a first selection of (i) at least one of the one or more keywords, (ii) one or more additional words of the transcript, and (iii) at least one rule of the set of rules; and update a context identification component based on the selection.

* * * * *